(12) United States Patent
Paraschiv et al.

(10) Patent No.: US 12,440,160 B2
(45) Date of Patent: Oct. 14, 2025

(54) OCULAR BIOMECHANICAL PROPERTIES MEASURING AND MONITORING DEVICE

(71) Applicant: SENSIMED SA, Etagnieres (CH)

(72) Inventors: Adrian Paraschiv, Geneva (CH); Mario Schlund, Ecublens (CH); Thierry Varidel, Fey (CH); Raphael Fritschi, Lausanne (CH); Sacha Cerboni, Vuarrens (CH)

(73) Assignee: Sensimed SA, Etagnieres (CH)

( * ) Notice: Subject to any disclaimer, the term of this patent is extended or adjusted under 35 U.S.C. 154(b) by 855 days.

(21) Appl. No.: 17/631,157

(22) PCT Filed: Jul. 29, 2019

(86) PCT No.: PCT/EP2019/070353
§ 371 (c)(1),
(2) Date: Jan. 28, 2022

(87) PCT Pub. No.: WO2021/018376
PCT Pub. Date: Feb. 4, 2021

(65) Prior Publication Data
US 2022/0257187 A1 Aug. 18, 2022

(51) Int. Cl.
*A61B 5/00* (2006.01)
*A61B 3/16* (2006.01)
*A61B 5/01* (2006.01)

(52) U.S. Cl.
CPC .............. *A61B 5/6821* (2013.01); *A61B 3/16* (2013.01); *A61B 5/0008* (2013.01); *A61B 5/01* (2013.01);
(Continued)

(58) Field of Classification Search
CPC ......... A61B 5/6821; A61B 3/16; A61B 5/008; A61B 5/01; A61B 2562/0247;
(Continued)

(56) References Cited

U.S. PATENT DOCUMENTS

| 4,089,329 A | * | 5/1978 | Couvillon, Jr. | ...... A61B 5/0031 128/903 |
| 2009/0076367 A1 | * | 3/2009 | Sit | ............................ A61B 3/16 600/398 |

(Continued)

FOREIGN PATENT DOCUMENTS

| EP | 3266373 A2 | 1/2018 |
| WO | WO-2020040709 A1 * | 2/2020 ............... A61B 3/16 |

OTHER PUBLICATIONS

Leonardi, M et al., A soft contact lens with a MEMS strain gage embedded for intraocular pressure monitoring, Transducers, Solid-State Sensors, Actuators and Microsystems, 12th International Conference, IEEE, Jun. 8, 2003 p. 1043.
(Continued)

*Primary Examiner* — Eric F Winakur
*Assistant Examiner* — Sienna C Pyle
(74) *Attorney, Agent, or Firm* — Weston R. Gould; Dinsmore & Shohl LLP

(57) ABSTRACT

The present invention relates to an OBP measuring and monitoring device comprising a contact lens presenting an inner surface and an outer surface and a sensing unit, said sensing unit being united with said contact lens such that it is applied against an eye of a user for sensing at least a first OBP and a second OBP of said eye when said contact lens is worn by said user, said sensing unit being adapted to measure simultaneously or consecutively the first and second OBPs and transmit these OBPs to a CPU such that said CPU receiving said measurement is able to determine at least one new biomarker based on a combination between at least these two OBPs.

23 Claims, 4 Drawing Sheets

(52) U.S. Cl.
 CPC .............. *A61B 2562/0247* (2013.01); *A61B 2562/0261* (2013.01); *A61B 2562/0271* (2013.01); *A61B 2562/06* (2013.01)

(58) Field of Classification Search
 CPC .... A61B 2562/0261; A61B 2562/0271; A61B 2562/06; A61B 5/0002; A61B 3/107; A61B 3/18
 See application file for complete search history.

(56) References Cited

U.S. PATENT DOCUMENTS

| | | | |
|---|---|---|---|
| 2013/0184554 A1* | 7/2013 | Elsheikh | A61B 3/16 600/398 |
| 2014/0243645 A1* | 8/2014 | Leonardi | A61B 5/0002 600/398 |
| 2015/0148648 A1* | 5/2015 | Pugh | A61B 3/16 600/398 |
| 2015/0164321 A1 | 6/2015 | Weibel et al. | |
| 2017/0358942 A1* | 12/2017 | Pugh | A61B 5/021 |
| 2019/0274546 A1* | 9/2019 | Elsheikh | A61B 3/16 |

OTHER PUBLICATIONS

Leonardi, M. et al., Wireless contact lens sensor for intraocular pressure monitoring: assessment on enucleated pig eyes, ACTA Ophthalmologica: The Ophthalmological Journal Of The Nordic Countries, 87(4): 433-437, Jun. 1, 2009.

* cited by examiner

OCULAR BIOMECHANICAL PROPERTIES MEASURING AND MONITORING DEVICE

TECHNICAL FIELD

The present invention relates to a device, a kit, a system and a method for measuring and monitoring a plurality of ocular biomechanical properties (OBP). The present invention relates in particular to a device that can be placed on the eye of a user to monitor a plurality of ocular biomechanical properties over an extended period of time, for example 8 hours, 12 hours, 24 hours or more.

BACKGROUND OF THE ART

Glaucoma is a widespread disease characterized by an elevated intraocular pressure (IOP). This elevated IOP produces a gradual loss of peripheral vision. There is therefore a need to have a detailed knowledge of IOP as well as other related ocular biomechanical properties (OBP) in glaucoma patients in order to provide reliable diagnostics or for setting up new therapies.

There have been provided several solutions for measuring IOP in glaucoma patient. Some solutions use direct pressure sensor which require a rigid contact lens to directly detect the intraocular pressure, some other solutions measure different parameters such as the eye's dimensional variation through the use of different types of strain gauges which require a soft contact lens. Each of these solutions being limited to the fact that they measure a single parameter. Therefore, when several parameters are required, several measurement sessions are needed. Given that a measurement preferably lasts for at least 24 hours, this can be very uncomfortable for the patient.

For example, inventors found that the relationship between different OBPs, such as, but not limited to IOP and temperature or/and even optionally dimensional variation of the eye permits the calculation of a new biomarker. Furthermore, despite IOP is the only modifiable risk factor, recent publications highlighted the valuable role of another OBP, the ocular volume change (OVC), as valuable information in relation to the disease pathogenesis. Such OBP will define a new biomarker as result of the ocular volumetric response to a pressure input in a corresponding time frame. IOP and OVC have been considered until now separately as there is no device able to detect simultaneously variation in pressure and corresponding variation in volume monitoring continuously.

A primary object of the present invention is therefore to provide for a device and a method capable of measuring two different OBPs, such as but clearly not limited to direct IOP, temperature and optionally eye's dimensional variation simultaneously, because the measurement conditions can vary from one measurement to the other one, so inventors have explored for a new device for simultaneously or consecutively measuring and monitoring two OBPs.

In the present application the term simultaneously means that the measured OBPs are measured during the same time interval regardless of the exact arrival time of each signal to the recording device. Even if there is a slight time phase between the two signals (few seconds or less) simultaneously means that the OBPs are measured during a single measurement period of time. On the other hand, the term consecutively means measuring a first OBP alone and then, without replacing the measuring and monitoring device, measuring a second OBP once the first measurement is completed.

In the present invention, ocular biomechanical properties (OBP) relate to parameters/properties such as intraocular pressure (IOP), intraocular volume (IOV), corneal rigidity, corneal thickness, sclera rigidity, geometrical dimensions and/or temperature of the eye and more generally any ocular property even non-biomechanical like a specific concentration.

A particular OBP, the Ocular Compliance (OC) measures the ability of an eye to increase its volume in case of an intraocular pressure increase. The value of OC can be defined as:

$$OC = \frac{\partial IOV}{\partial IOP}$$

Since the viscoelastic properties of the eye tissues create a pressure relaxation which tends to reduce the intraocular pressure (IOP) over time at a constant intraocular volume (IOV), this is not a constant value but the slope at a given time of the Volume vs Pressure relationship.

In this regard, another object of the invention is to solve the above-mentioned problems and more particularly to provide a pressure sensitive device accurately measuring IOP and eye's dimensional variation simultaneously over a large period of time while allowing data transmission wirelessly.

However another challenge which has been faced by the inventors relates to the difficulty in designing a device capable of measuring IOP and OVC since these two OBP are measured in different manner and requires different stiffness environment such that such a device requires both hard and soft contact lens portions.

Therefore, another object of the invention is to provide a new contact lens-like OBP sensitive device providing the advantages of both the hard and soft contact lenses without their drawbacks.

Another object of the invention is to provide a new contact lens-like OBP sensitive device providing at least one new biomarker based on the relation between the IOP and the eye's dimensional variation.

SUMMARY OF THE INVENTION

The above problems are solved by the present invention.

A first aspect of the invention is an OBP measuring and monitoring device comprising a contact lens presenting an inner surface and an outer surface and a sensing unit, said sensing unit being united with said contact lens such that it is applied against an eye of a user for sensing at least a first OBP and a second OBP of said eye when said contact lens is worn by said user, said sensing unit being adapted to measure simultaneously or consecutively the first and second OBPs and transmit these OBPs to a CPU such that said CPU receiving said measurement is able to determine at least one new biomarker based on a combination between at least these two OBPs.

Preferably, the sensing unit comprises a single sensor capable of measuring at least two different OBPs. Therefore, the lens is less cumbersome.

Alternatively the sensing unit comprises at least two single sensors each capable of measuring a single OBP. In this manner, the measurements can be made simultaneously.

Preferably, the at least two single sensors are each capable of measuring a single OBP different from each other.

According to a preferred embodiment, the first OBP is the intraocular pressure and the second OBP is the eye's temperature. In this manner, more precise IOP as a new biomarker can be measured.

Alternatively, the first OBP is the intraocular pressure and the second OBP is the eye's dimensional variation. In this manner, a new biomarker can be measured.

Advantageously, the sensing unit comprises an eye's dimensional variation sensor as an active strain gauge presenting a circular or arc shape and is situated in an outer portion around an inner portion of said soft contact lens. The strain gauge can therefore easily sense the soft contact lens deformation.

Preferably, the eye's dimensional variation sensor comprises several active strain gauges.

According to a preferred embodiment, said strain gauge is made of a resistive material, such as a metal or an alloy.

Preferably, said strain gauge is a continuous longitudinal element.

Advantageously, the eye's dimensional variation sensor comprises four gauges in a Wheatstone bridge configuration, such as two active gauges and two passive ones being placed alternatively on the bridge. This permits to compensate for the temperature deviation and to double sensitivity.

According to a preferred embodiment, the sensing unit comprises a direct pressure sensor.

Preferably, the contact lens is a soft contact lens comprising an inner portion and an outer portion, said inner portion being more rigid than said outer portion. In this manner, the surface in contact with the eye is the soft contact lens and both pressure sensor and the more rigid portion are encapsulated within that contact lens.

According to a preferred embodiment, the direct pressure sensor is located in said inner portion. As a result of this proposed composite structure using materials of different rigidity, the pressure sensor can therefore accurately measure the IOP.

Advantageously, the inner portion is adapted to at least partially rigidify a central portion of the inner surface of said contact lens so as to maintain said rigidified inner surface with a curvature radius adapted to flatten at least a portion of the eye surface in contact with the direct pressure sensor so as to reach a pressure equilibrium around the direct pressure sensor when said contact lens is worn by said user.

Advantageously, the inner portion has a general shape similar to a meniscus lens. In this manner, it has the same general shape as the contact lens and more closely fits to the eye general shape.

Preferably, the inner portion is smaller in dimension compared to the outer portion and is centered in the contact lens. Thus, it can be more easily placed inside the contact lens since the center part of the contact lens is thicker.

According to a preferred embodiment, the inner portion comprises a rigid insert.

Preferably, the rigid insert comprises a plurality of through holes. In this manner, it prevents hypoxia of the eye through the rigid insert and it also permits securing the rigid insert within the contact lens.

Advantageously, the rigid insert is made of a material chosen in the group of polymers, biopolymers, ceramics, glasses, metals and RGP.

Preferably, the outer portion of said contact lens is made of a material chosen in the group of hydrogels, silicone-hydrogels and silicones.

Advantageously, any one of the inner portion and the outer portion of said contact lens is made of a material having a tunable stiffness or a stiffness gradient.

Preferably, the pressure sensor is in direct contact with the eye of the user when the user is wearing the contact lens. In this manner, a favorable contact is established between the pressure sensor and the measurement interface so as to improve the sensitivity.

Alternatively, the pressure sensor is in indirect contact with the eye of the user when the user is wearing the contact lens. Thus, the pressure sensor is protected from the direct contact to the eye surface in order to improve comfort.

According to a preferred embodiment, the pressure sensor is located within a cavity formed in an inner concave side of the rigid insert, and wherein the cavity is filled with a pressure transmitting filler material that covers the pressure sensor such that a layer of the filler material is located between the pressure sensor and the inner surface of the contact lens when the user is wearing the contact lens. In this manner, the pressure sensor is not in direct contact with the rigid insert.

Preferably, the filler material is a material softer than the inner portion. Thus, allowing a perfect mechanical insulation of the pressure sensor.

Alternatively, the filler material is softer than the material of the outer portion. In this manner, radial forces transmitted by the soft material of the contact lens are without influence or attenuation on the pressure sensor.

Alternatively, the filler material is the same material as the material of the outer portion. In this manner, the device is more easily manufactured.

Preferably, the cavity is formed in the center of the inner portion. Thus, it is provided on the thicker portion of the contact lens.

Advantageously, the inner surface of the contact lens beneath the cavity presents a softer surface than the rest of the inner surface beneath the inner portion. In this manner, the IOP is transmitted with a lowered attenuation.

Alternatively, the inner surface of the contact lens beneath the cavity presents a surface softness similar than the rest of the inner surface beneath the inner portion. Thus, achieving the mechanical insulation from the rigid insert without material discontinuity between the pressure sensor and the eye.

According to a preferred embodiment, the contact lens further comprises an antenna and a microprocessor for telemetry powering and data transfer. In this manner, this permits wireless transfer of data.

Preferably, the sensing unit comprises a plurality of OBP sensors adapted to measure the same OBP. In this manner, accuracy of the measurement can be improved through aggregation of the results.

Furthermore, the OBP measuring and monitoring device of the invention doesn't need to be customized for each user, because it can be adapted to a large number of patients by having several sizes available that only differ in their external shape so as to easily adapt to different eye shapes and sizes. The OBP measuring and monitoring device can also be worn over a long period of time without discomfort for the user.

A second aspect of the invention relates to a kit comprising an OBP measuring and monitoring device of the first aspect of the invention, and a portable recording device configured for communicating with the OBP measuring and monitoring device and for storing data received from the OBP measuring and monitoring device. The particular advantages of this kit of the invention being similar to the ones of the device of the first aspect of the invention, they will not be repeated here.

Preferably, the portable recording device is configured for powering the OBP measuring and monitoring device over a wireless inductive communication channel. Thus, this prevents the use of invasive wiring within the eye.

Alternatively, the OBP measuring and monitoring device comprises a miniaturized power source embedded within it.

Even preferably, the contact lens further comprises a data storage embedded within it.

A third aspect of the invention relates to an OBP monitoring system comprising an OBP measuring and monitoring device of the first aspect of the invention; a portable recording device configured for communicating with the OBP measuring and monitoring device and for storing data received from the OBP measuring and monitoring device; a computing device configured for communicating with the portable recording device for receiving and/or processing and/or storing data received from the portable recording device. The particular advantages of this system of the invention being similar to the ones of the device of the first aspect of the invention, they will not be repeated here.

Preferably, the OBP monitoring system comprises two OBP measuring and monitoring devices, one for a left eye, one for a right eye, of the first aspect of the invention and the portable recording device is configured for communicating with the two OBP measuring and monitoring devices and for storing data received from the two OBP measuring and monitoring devices.

A fourth aspect of the invention relates to an OBP measuring and monitoring method comprising the steps of placing the kit of the second aspect of the invention on the patient, starting a simultaneous measurement of two OBPs, recording the OBP signals in the portable recording device, sending the recorded OBP data to a computing device configured for communicating with the portable recording device for receiving and/or processing and/or storing data received from the portable recording device, wherein the computing device is adapted to calculate and determine at least one new biomarker based on the relation between at least these two OBPs.

Preferably, the OBP measuring and monitoring method comprising the steps of measuring a temperature of the eye and use the temperature for running a fine tuning of the OBP measurements.

BRIEF DESCRIPTION OF THE DRAWINGS

Further particular advantages and features of the invention will become more apparent from the following non-limitative description of at least one embodiment of the invention which will refer to the accompanying drawings, wherein.

DETAILED DESCRIPTION OF THE INVENTION

The present detailed description is intended to illustrate the invention in a non-limitative manner since any feature of an embodiment may be combined with any other feature of a different embodiment in an advantageous manner.

Figure 1:
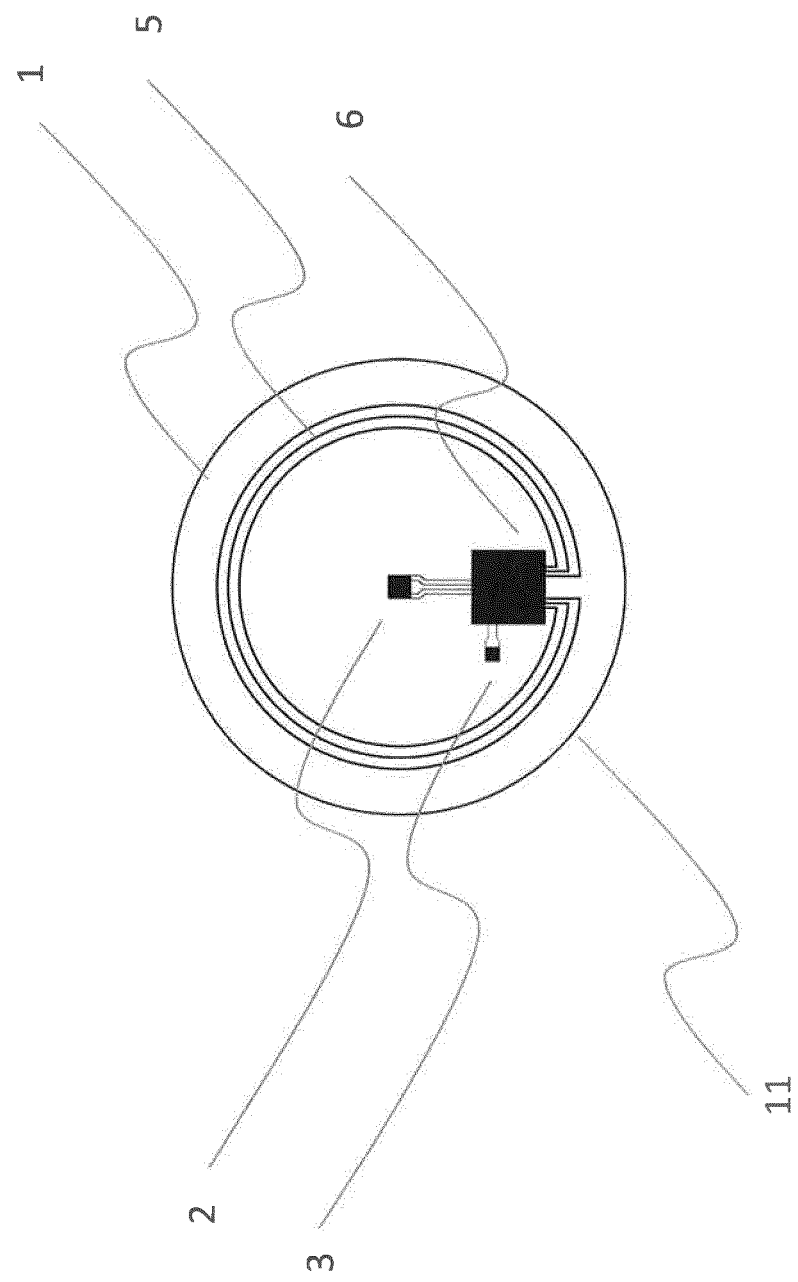
FIG. 1 represents an OBP measuring and monitoring device according to a first embodiment of the present invention.

FIG. 1 shows an OBP measuring and monitoring device 11 more in detail. According to the first embodiment of the invention it comprises a contact lens 1 presenting an inner surface and an outer surface and a sensing unit being united with the contact lens 1 such that it is applied against an eye of a user for sensing at least a first OBP and a second OBP of said eye when said contact lens 1 is worn by said user, said sensing unit being adapted to measure simultaneously or consecutively the first and second OBPs and transmit these OBPs to a CPU such that said CPU receiving said measurement is able to determine at least one new biomarker based on a combination between at least these two OBPs.

In the first embodiment, the sensing unit comprises two single sensors 2 and 3 each capable of measuring a single OBP. In this manner, the measurements can be made simultaneously. According to this preferred embodiment, the first OBP is the intraocular pressure sensed by a direct pressure sensor 2 and the second OBP is the eye's temperature sensed by a temperature sensor 3. In this manner, a more precise IOP as a new biomarker can be measured.

Thanks to this sensor, one can measure the temperature of the eye simultaneously with the IOP. This permits, if necessary to have the knowledge of the eye temperature which can help to correct its influence on the pressure measurement and provide a tool for a fine tuning of the measured IOP. Furthermore, it permits to measure the eye's temperature and observe it as a new biomarker. It has to be noted that providing a temperature sensing element in the OBP measuring and monitoring device can permit avoiding the temperature correction means within the contact lens 1, or even preferably permits the additional use of temperature correction means to use both corrections.

Therefore, the device 11 comprises a direct pressure sensor 2 united with the contact lens 1 and located such that it is applied against an eye of a user for sensing the intraocular pressure (IOP) of the eye when the contact lens 1 is worn by the user and an eye temperature sensor 3.

The contact lens 1 is preferably made of an impermeable and/or silicone-based material, which is known to highly adhere to the eyeball surface. It preferably comprises an outer soft portion and an inner rigid portion. The rigid portion, which is preferably, but not mandatorily, a lens portion rigidified by a rigid insert, is adapted to at least partially rigidify the inner surface of the contact lens 1 and provide the rigidified inner surface with a curvature radius adapted to flatten at least a portion of the eye surface in contact with the pressure sensor 2 so as to reach a pressure equilibrium around the pressure sensor when the contact lens 1 is worn by the user.

The pressure sensor 2 is for example a miniaturized pressure sensor comprising a piezoresistive silicon micromachined pressure sensor on a ceramic, glass or silicon carrier. The pressure sensor 2 is either an absolute pressure sensor or a relative pressure sensor.

An advantage of using a relative pressure sensor 2 in the OBP measuring and monitoring device 11 of the invention is that, if the pressure around the back side of the diaphragm corresponds to the ambient or atmospheric pressure, the pressure measured by the pressure sensor essentially corresponds to the intraocular pressure (IOP), free from the effects of the ambient or atmospheric pressure that are due for example to changes in altitude and/or weather conditions.

An advantage of using an absolute pressure sensor 2, on the other hand, is that it is much easier to embed in the contact lens 1 for manufacturing.

Figure 2:
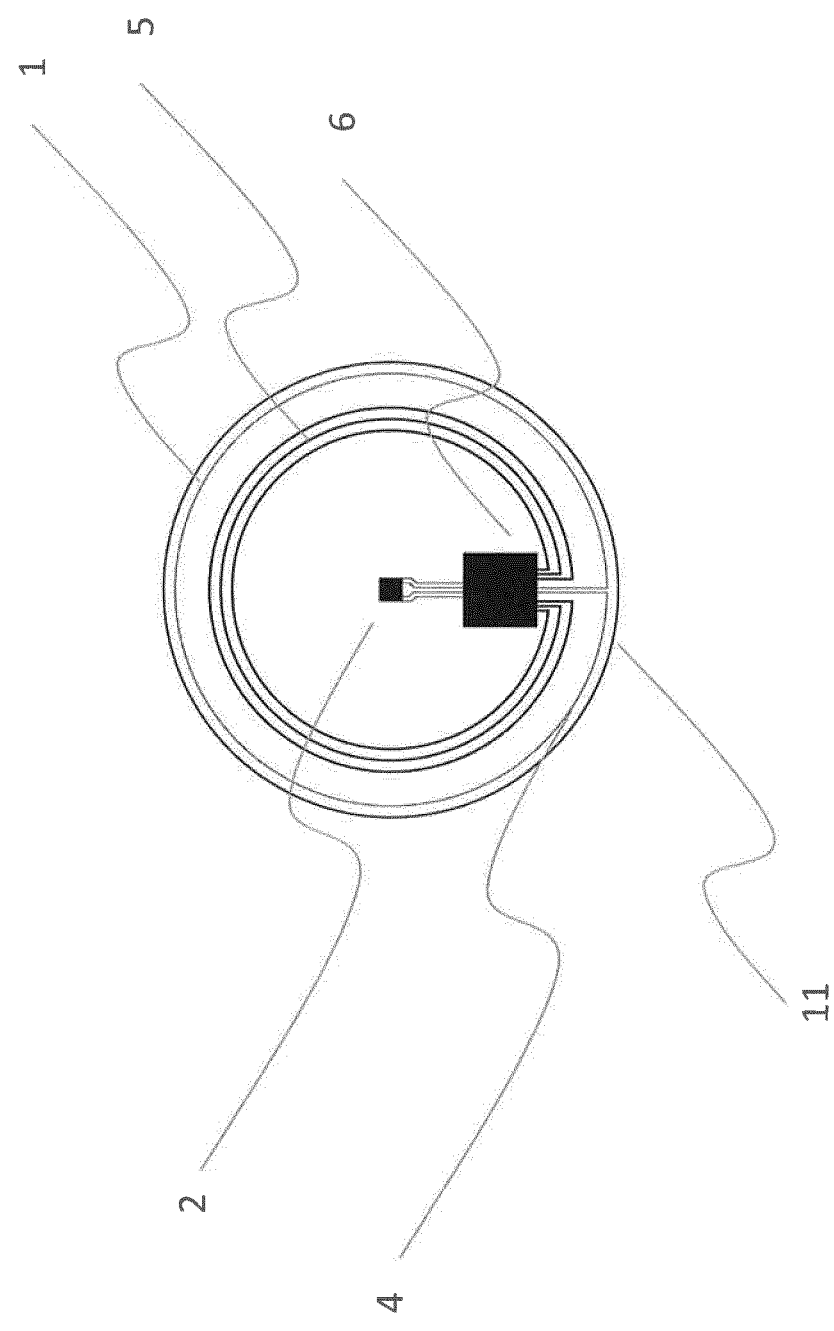
FIG. 2 represents an OBP measuring and monitoring device according to a second embodiment of the present invention.

FIG. 2 shows a second embodiment of the present invention where the second OBP which is sensed is not the temperature but the eye's dimensional variation.

In this embodiment, the soft contact lens 1 of the OBP measuring and monitoring device 11 of the present invention includes an eye's dimensional variation sensor 4 which can be a circular active strain gauge disposed on the outer soft portion around the lens center located in the inner portion. Preferably, the active strain gauge 4 is made of at least one continuous longitudinal element, preferably a wire, which is folded in such a way that several of its portions are concentric.

The simultaneous measurement of the IOP through a direct pressure sensor 2 and the eye's dimensional variation through an active strain gauge 4 permits to calculate, through a combination of these two OBPs, at least one third data which can give a new biomarker, the Ocular Compliance (OC) which would represent how the eye's volume and/or shape, i.e. the eye's dimension, accommodates to pressure changes and vice-versa.

In addition, this simultaneous measurement permits to collect two OBPs with a single measurement session instead of two, one with the direct pressure sensor 2 and one with the active strain gauge 4.

Indeed, variations of the intraocular pressure (IOP) generate deformations of the eyeball of a user. Typically, when the IOP rises, the eyeball dilates, and when the IOP diminishes, the eyeball contracts. When the device 11 of the invention is worn by the user, the deformations of his or her eyeball induce deformations of the peripheral soft portion of the contact lens 1 that is in close contact with the eyeball, the amplitude of the deformations of the contact lens 1 being larger at the periphery of the outer portion than at the inner portion.

The active strain gauge 4 is configured and located on the peripheral outer portion of the soft contact lens 1 in order to be subjected to the deformations. Accordingly, a portion of the active strain gauge 4 is placed on the outer soft portion around the center C of the contact lens 1 and at least partly encircles the center C. The active strain gauge 4 thus describes, or covers, an arc of circle that is preferably centered on the center C of the contact lens 1.

However, the configuration of this strain gauge portion 4 can vary within the frame of the invention, depending for example on the sought electrical properties of the active strain gauge, the method used for its manufacturing, the place available on the contact lens 1, etc. The portion of the active strain gauge 4 that is placed around the center C is for example made of one or more curved or circular segments forming one or more concentric arcs, or of one or more rectilinear segments forming for example one or more parts of a polygon, a mesh or any other adapted shape. A combination of one or more of the above shapes is also possible within the frame of the invention.

Independently of its configuration, the portion of the active strain gauge 4 that is placed around the center C preferably covers an arc of at least 180 degrees around said center C, thus encircling the center C on at least 180°, i.e. on at least the half of its periphery, in order to provide for a sufficient and reliable sensing of the contact lens's deformations that are due to eye's dimensional variation, and thus in order to provide for a reliable measurement of the eye's dimensional variation.

Even more preferably, in order to maximize the length of the portion of the active strain gauge 4 that is placed around the center C, thereby maximizing the sensitivity of the active strain gauge 4, the portion of the active strain gauge 4 that is placed around the center C covers as much as possible of an entire circle around the center C.

In a preferred embodiment, the active strain gauge 4 is a relatively thin and essentially circular electrical conductor placed at the periphery of the contact lens 1. Both ends of the active strain gauge 4 are in electrical contact with the microprocessor 6. The section of the portion of the active strain gauge 4 that is placed around the center C of the contact lens 1 is chosen small enough for the active stain gauge 4 to be deformable when submitted to the effects of the eye's dimensional variations. The active strain gauge 4 is preferably made by etching, embossing and/or cutting of a thin metallic foil. In a variant embodiment, the active strain gauge 4 is made of a thin metallic wire. In still a variant embodiment, the active strain gauge 4 is made by deposition of metal and/or of any other electrically conducting material, onto a preferably flexible and transparent substrate, for example onto a polyimide film.

According to the invention, and as explained above, the active strain gauge 4 being united to the contact lens 1, deformations of the contact lens 1 induce deformations of the active strain gauge 4, thereby modifying its physical properties, in particular its electrical properties. For example, if the IOP rises and the eyeball dilates or its shape changes, the contact lens 1 is extended at its periphery and the active strain gauge 4 is stretched. This creates a diminution of the section of the portion of the active strain gauge 4 placed around the center C of the contact lens 1 and thus an augmentation of its electrical resistance. By measuring the variations of the electrical resistance of the active strain gauge 4, it is thus possible to detect and measure the eye's dimensional variation.

Other factors than the deformation of the eyeball, and thereby of the contact lens 1, might however affect the electrical resistance of the active strain gauge 4, in particular environmental parameters such as the temperature, the humidity, the ambient pressure, etc.

Therefore, the strain gauge arrangement system for detecting the eye's dimensional variation preferably comprises four gauges in a Wheatstone bridge configuration, for example two active gauges and two passive ones being placed alternatively on the bridge.

As shown in FIG. 2, the outer soft portion at least partially surrounds the inner rigid portion which preferably has a generally meniscus or convex-concave lens shape.

Here it shall be understood that the term rigid portion designates both the possible rigid insert embedded within the contact lens 1 in order to rigidify a portion of the contact lens 1, but it can also designate a possible rigidified portion of the contact lens 1, preferably at the center of the contact lens 1, which is actually rigidified by the insert or the rigidified portion.

The preferred materials for the soft portion are any one chosen in the group comprising any preferably soft materials such as hydrogels, silicone-hydrogels and silicones or any other soft material suitable for a contact lens. In consequence, materials adapted for rigid or semi-rigid lenses, such as PMMA and the same, should be avoided.

On the other hand, the preferred materials for the rigid portion are any one chosen in the group comprising any preferably materials such as polymers, ceramics, biopolymers, glasses, RGP or materials such as metals, and the like that have a sufficient rigidity so to impose their shape to the cornea. This material can be shaped before being assembled (rigid insert) or be molded during the assembly process.

Alternatively, any one of the soft portion and the rigid portion of said contact lens 1 is made of a material having a tunable stiffness or a stiffness gradient. An example of such material may comprise an elastomer composite embedded with phase-changing metal alloy or with shape memory polymer to reversibly tune the rigidity of an elastomer composite.

Another example comprises silicone elastomers with tunable stiffness. Herein, the capability to tune the stiffness of silicone materials is made via careful control over the chemistry, network formation, and crosslink density of the formulation.

The pressure sensor 2 can be in direct contact with the eye of the user when the user is wearing the contact lens 1 in such case, the inner surface of the contact lens 1.

However, this is not necessarily the case, because the pressure sensor 2 can be located within a cavity formed in an inner concave side of the rigid portion, and the cavity is filled with a pressure transparent filler material that covers the pressure sensor 2 such that a layer of the filler material is located between the pressure sensor 2 and the surface of the eye when the user is wearing the contact lens 1. In this case, the pressure sensor 2 is in indirect contact with the eye of the user when the user is wearing the contact lens 1. The filler material can be a material softer than the rigid portion and also softer than the material of the soft portion. In this case, the inner surface of the contact lens 1 beneath the cavity presents a softer surface than the rest of the inner surface beneath the rigid portion. Alternatively, the filler material can be of the same softness as the material of the soft portion and also can be the same material as the material of the soft portion.

As shown in this figure, the contact lens 1 further comprises a microprocessor 6 and an antenna 5 for telemetry powering and data transfer between the contact lens 1 and a processing unit.

Preferably, the pressure sensor 2 is located in the center of the contact lens 1. According to this embodiment, the pressure sensor 2 is for example placed in a, for example circular, cavity formed in the center of the contact lens 1. Alternatively, the cavity is asymmetrical relative to the center of the contact lens 1, for example a round and off-centered cavity, a semi-annular groove or any other adapted shape. In this case, the microprocessor 6 is for example placed inside the contact lens 1.

Other cavity shapes and/or locations are however possible within the frame of the invention for placing the pressure sensor 2 and/or other elements of the OBP measuring and monitoring device 11 in the contact lens 1, provided that it does not hinder the active strain gauge 4 function.

Although not represented here, the device can comprise a plurality of pressure sensors 2 for accurate measurements.

Figure 3:
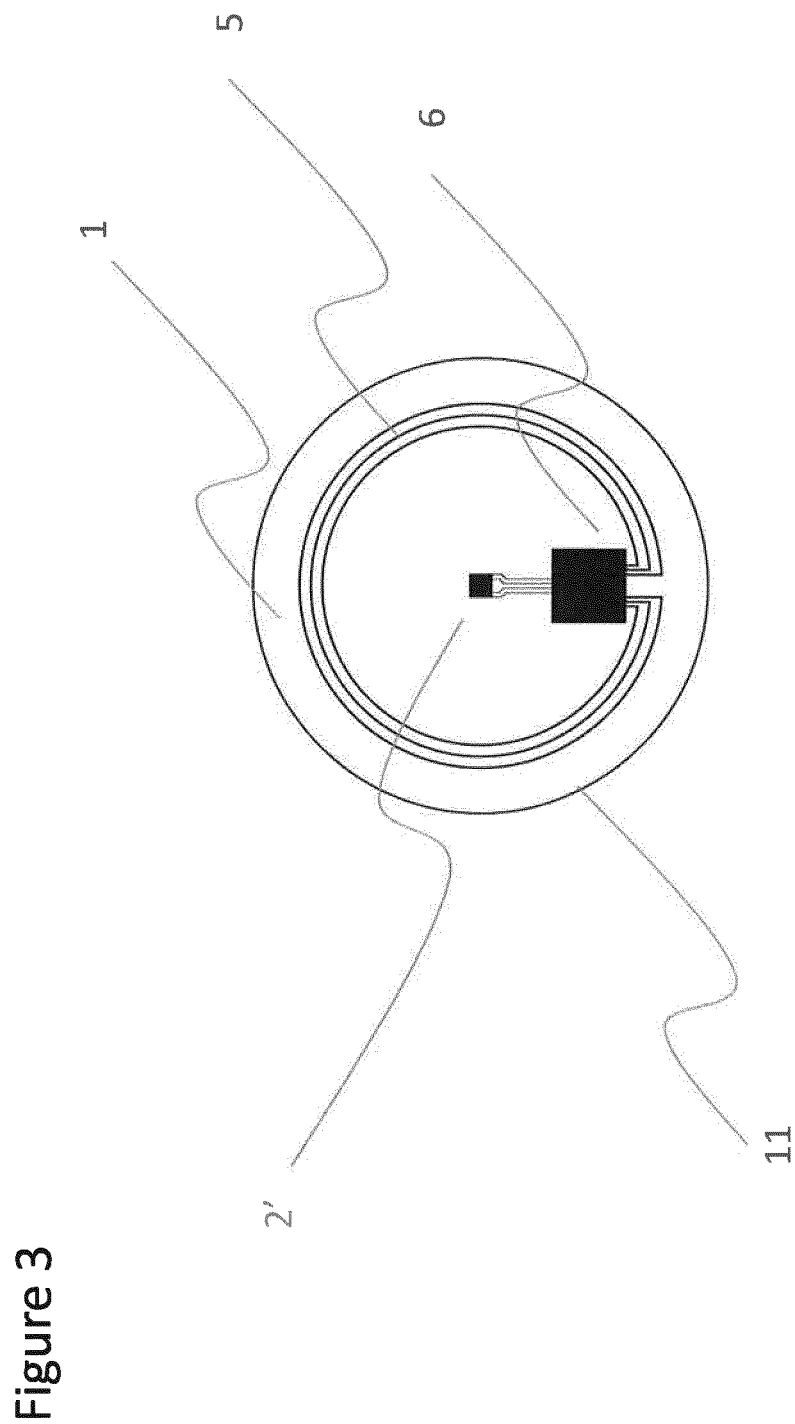
FIG. 3 schematically represents an OBP measuring and monitoring device according to a third embodiment of the present invention.

FIG. 3 represents a third embodiment of the invention where the OBP measuring and monitoring device 11 comprises a contact lens 1 presenting an inner surface and an outer surface and a sensing unit being united with the contact lens 1 such that it is applied against an eye of a user for sensing at least a first OBP and a second OBP of said eye when said contact lens 1 is worn by said user, said sensing unit being adapted to measure simultaneously or consecutively the first and second OBPs and transmit these OBPs to a CPU such that said CPU receiving said measurement is able to determine at least one new biomarker based on a combination between at least these two OBPs.

This device is similar to the one of the first embodiment with the difference that instead of presenting two distinct sensors, the sensing unit is constituted by a single sensor 2' which is able to measure both the IOP and the eye's temperature.

Although not represented in the drawings, the present invention also covers an embodiment covering the combination of embodiment 1 and 2 or 2 and 3, where the device would comprise an IOP sensor, an eye's dimensional variation sensor and a temperature sensor, where the IOP sensor and the temperature sensor are combined or not.

In all the above embodiments, the OBP measuring and monitoring device 11, in particular the microprocessor 6 and/or the pressure sensor 2, is preferably wirelessly inductively powered through an antenna, for example by a portable recording device 12.

In a variant embodiment, the OBP measuring and monitoring device 11 comprises a power source, for example a battery or micro fuel cell or a wireless energy source like infrared or solar cells or any energy harvesting system, for powering the microprocessor 6 and/or the pressure sensor 2.

Another aspect of the invention is a kit comprising an OBP measuring and monitoring device 11 described above and a portable recording device 12 configured for communicating with the OBP measuring and monitoring device 11 and for storing data received from the OBP measuring and monitoring device 11. Preferably, the portable recording device 12 is configured for powering the OBP measuring and monitoring device 11 over a wireless inductive communication channel. If the kit comprises more than one OBP measuring and monitoring devices 11, for example one device for the left eye of the patient and a second device for the right eye of a patient, the portable recording device 12 is configured for communicating with all the OBP measuring and monitoring devices 11 and for storing data received from all the OBP measuring and monitoring devices 11.

Another aspect of the invention is an OBP monitoring system comprising an OBP measuring and monitoring device 11 described above; a portable recording device 12 configured for communicating with the OBP measuring and monitoring device 11 and for storing data received from the OBP measuring and monitoring device 11; a computing device 13 configured for communicating with the portable recording device 12 for receiving and/or processing and/or storing data received from the portable recording device 12.

Figure 4:
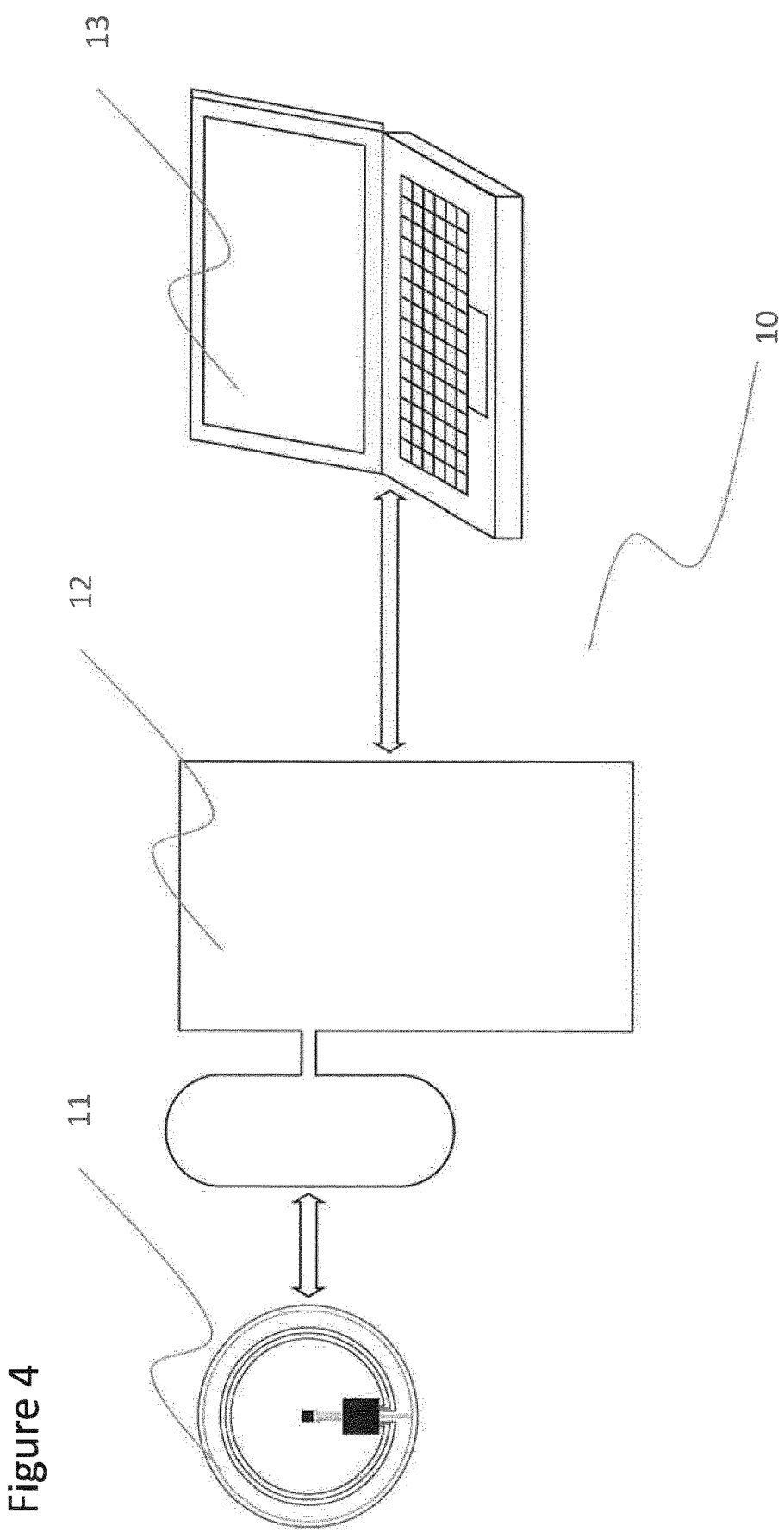
FIG. 4 represents an OBP measuring and monitoring system comprising the OBP measuring and monitoring device according to the present invention.

FIG. 4 is a schematic representation of a typical OBP measuring and monitoring system 10 using the OBP measuring and monitoring device 11 of the invention. According to the illustrated embodiment, the OBP measuring and monitoring system 10 comprises the OBP measuring and monitoring device 11 of the present invention, a portable recording device 12 for communicating with the OBP measuring and monitoring device 11 and storing the collected information during the OBP monitoring periods, and a computing device 13, for example a personal computer, for storing, analyzing, computing and/or displaying the data collected and stored by the portable recording device 12.

The portable recording device 12 comprises a first communication interface for communicating with the OBP measuring and monitoring device 11. The first communication interface is for example a wireless communication interface comprising an antenna that is advantageously placed near the contact lens 1 when the OBP measuring and monitoring device 11 of the invention is worn by a user. The antenna is for example integrated into eyeglasses and/or into a for example disposable, flexible and hypoallergenic patch, also not represented on the figure, that are or is worn by the user during the OBP monitoring periods. Other means are however possible within the frame of the invention for placing the antenna at a suitable distance from the OBP measuring and monitoring device 11 when the latter is worn by a user. The portable recording device 12 further comprises a second communication interface for communicating with the computing device 13.

When monitoring OBP, the user wears the OBP measuring and monitoring device 11 by placing the contact lens 1 on his or her eye, just like any ordinary contact lens, and carries the portable recording device 12. The antenna is placed as close as possible to the user's eye wearing the OBP measuring and monitoring device 11 in order to allow the establishment of a first wireless communication, for example inductive communication such as RFID, channel between the OBP measuring and monitoring device 11 and the portable recording device 12. Preferably, the antenna is furthermore oriented in a plane as parallel as possible to the plane of the antenna 5 of the OBP measuring and monitoring device 11 of the invention in order to allow for an efficient powering of the microprocessor 6 and/or of the pressure sensor 2 over the communication channel, which is for example a close distance inductive communication channel. The antenna is for example integrated in eyeglasses and/or into a patch surrounding the eye along with the recording device or not, depending on the embodiment of the portable recording device, for example into a disposable, flexible and hypoallergenic patch, and/or in a cap or in another piece of clothing or accessory worn by the user. Preferably, the antenna is centered with the antenna 5 of the OBP measuring and monitoring device 11 when the OBP measuring and monitoring device 11 and the portable recording device 12 are both worn by the user. The diameter of the antenna of the portable recording device 12 is preferably larger than the diameter of the OBP measuring and monitoring device 11. The shape of the antenna of the portable recording device 12 is for example round, oval, rectangular, or any other appropriate shape. The shape of the antenna of the portable recording device 12 is preferably adapted to the shape of the device, for example the eyeglasses, the patch, the piece of garment, etc., to which it is attached.

According to an embodiment, while monitoring OBP, the portable recording device 12 powers the OBP measuring and monitoring device 11 through the first communication channel at for example regularly spaced time intervals and collects data sent by the microprocessor 6 through the antenna 5 of the OBP measuring and monitoring device 11. Collected data for example comprises IOP values derived from the pressure sensor 2 and/or eye's temperature values derived from temperature sensor 3 and/or electrical signals of the strain gauges of the eye's dimensional variation sensor 4 of the OBP measuring and monitoring device 11. The collected data is stored in internal memory of the portable recording device 12. The OBP is for example measured at a frequency of 10 to 100 Hz during 10 to 60 seconds every 1 to 10 minutes. This allows a precise monitoring of the OBP variations over extended periods of time, including at night, while the user is asleep. However, this is not limiting and the measurement frequency can be different, for example a 1 Hz continuous OBP measurement throughout the day.

At some preferably predefined moments in time, for example once a day, once a week or once a month, the user and/or a practitioner connects the portable recording device 12 to a computing device 13, for example a personal computer, over a second, preferably wireless, communication channel, for example a Bluetooth communication channel. The second communication channel can however also be a wired communication channel, for example a USB or any other appropriate communication channel. The data collected and stored in the internal memory of the portable recording device 12 is then transferred over the second communication channel to the computing device 13 for further analysis and/or computing by the user and/or by the practitioner.

According to a further embodiment, the invention relates to an OBP measuring and monitoring method comprising the steps of placing the kit of the invention on the patient, starting a measurement of the OBP, recording the OBP signals in the portable recording device 12, sending the recorded OBP data to a computing device 13 configured for communicating with the portable recording device 12 for receiving and/or processing and/or storing data received from the portable recording device 12, wherein the computing device 13 is adapted to calculate and determine at least one new biomarker based on a combination of at least two OBPs.

Preferably, the OBP measuring and monitoring method comprising the steps of measuring a temperature of the eye and use the temperature for running a fine tuning of the OBP measurements.

In variant embodiments, the OBP measuring and monitoring system 10 comprises two OBP measuring and monitoring devices 11 in order to allow simultaneously monitoring both eyes of a patient, for example over extended periods of time. Preferably, both OBP measuring and monitoring devices 11 simultaneously and/or alternatively communicate with the same portable recording device 12 that for example is connected to and/or comprises two antennas. Accordingly, the portable recording device 12 preferably stores or records data received from both OBP measuring and monitoring devices 11.

While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the scope of this disclosure. This is for example particularly the case regarding the different apparatuses which can be used.

The invention claimed is:

1. An ocular biomechanical properties (OBP) measuring and monitoring method comprising placing a contact lens presenting an inner surface and an outer surface and a sensing unit on an eye of a user, said sensing unit being united with said contact lens such that it is applied against an eye of a user for sensing at least a first OBP and a second OBP of said eye when said contact lens is worn by said user, simultaneously or consecutively measuring the first and second OBPs with said sensing unit and transmitting the first and second OBPs to a CPU and determining using said CPU at least one new biomarker based on a combination between at least the first and second OBPs.

2. The OBP measuring and monitoring method according to claim 1 characterized in that the sensing unit comprises a single sensor capable of measuring at least two different OBPs.

3. The OBP measuring and monitoring method according to claim 1, characterized in that the sensing unit comprises at least two single sensors each capable of measuring a single OBP.

4. The OBP measuring and monitoring method according to claim 3, characterized in that the at least two single sensors are each capable of measuring a single OBP different from each other.

5. The OBP measuring and monitoring method according to claim 1, characterized in that the first OBP is an intraocular pressure and the second OBP is an eye's temperature or an eye's dimensional variation.

6. The OBP measuring and monitoring method according to claim 5, wherein the sensing unit comprises an eye's dimensional variation sensor as one or several active strain gauge presenting a circular or arc shape and is situated in an outer portion around an inner portion of said contact lens.

7. The OBP measuring and monitoring method according to claim 6, wherein said strain gauge is a continuous longitudinal element made of a resistive material.

8. The OBP measuring and monitoring method according to claim 6, wherein the eye's dimensional variation sensor comprises four gauges in a Wheatstone bridge configuration.

9. The OBP measuring and monitoring method according to claim 8, characterized in that the inner portion comprises a rigid insert.

10. The OBP measuring and monitoring method according to claim 9, characterized in that the rigid insert comprises a plurality of through holes.

11. The OBP measuring and monitoring method according to claim 9, characterized in that the rigid insert is made of one or more polymers, biopolymers, ceramics, glasses, metals, or RGP and/or an outer portion of said contact lens is made of one or more hydrogels, silicones or a combination thereof.

12. The OBP measuring and monitoring method according to claim 1, characterized in that the sensing unit comprises a direct pressure sensor.

13. The OBP measuring and monitoring method according to claim 12, characterized in that the contact lens is a soft contact lens comprising an inner portion and an outer portion, said inner portion being more rigid than said outer portion.

14. The OBP measuring and monitoring method according to claim 13, characterized in that the direct pressure sensor is located in said inner portion.

15. The OBP measuring and monitoring method according to claim 13, wherein the inner portion is adapted to at least partially rigidify a central portion of the inner surface of said contact lens so as to maintain said rigidified inner surface with a curvature radius adapted to flatten at least a portion of the eye surface in contact with the direct pressure sensor so as to reach a pressure equilibrium around the direct pressure sensor when said contact lens is worn by said user.

16. The OBP measuring and monitoring method according to claim 13, characterized in that the inner portion has a general shape similar to a meniscus lens.

17. The OBP measuring and monitoring method according to claim 13, characterized in that the inner portion is smaller in dimension compared to the outer portion and is centered in the contact lens.

18. The OBP measuring and monitoring method according to claim 13, characterized in that any one of the inner portion and the outer portion of said contact lens is made of a material having a tunable stiffness or a stiffness gradient.

19. The OBP measuring and monitoring method according to claim 12, characterized in that the pressure sensor is in direct contact or in indirect contact with the eye of the user and is located within a cavity formed in an inner concave side of the rigid insert, and wherein the cavity is filled with a pressure transmitting filler material that covers the pressure sensor such that a layer of the filler material is located between the pressure sensor and the inner surface of the contact lens.

20. The OBP measuring and monitoring method according to claim 19, characterized in that the filler material is a material softer than the inner portion and/or the outer portion or is the same material as the material of the outer portion.

21. The OBP measuring and monitoring method according to claim 19 characterized in that the cavity is formed in the inner portion.

22. The OBP measuring and monitoring method according to claim 19, characterized in that the inner surface of the contact lens beneath the cavity presents a surface softness softer or similar than the rest of the inner surface beneath the inner portion.

23. The OBP measuring and monitoring method according to claim 1, characterized in that the sensing unit comprises a plurality of sensors adapted to measure the same OBP.

* * * * *